United States Patent
Lee et al.

(10) Patent No.: US 7,108,840 B2
(45) Date of Patent: Sep. 19, 2006

(54) METHOD FOR MANUFACTURING NANOPHASE TIC-BASED COMPOSITE POWDERS BY METALLOTHERMIC REDUCTION

(75) Inventors: Dong-Won Lee, Kyungsangnam-do (KR); Byoung-Kee Kim, Busan (KR)

(73) Assignee: Korea Institute of Machinery & Materials, Daejeon (KR)

(*) Notice: Subject to any disclaimer, the term of this patent is extended or adjusted under 35 U.S.C. 154(b) by 418 days.

(21) Appl. No.: 10/600,159

(22) Filed: Jun. 20, 2003

(65) Prior Publication Data

US 2004/0161379 A1    Aug. 19, 2004

(30) Foreign Application Priority Data

Feb. 19, 2003    (KR) .................... 10-2003-0010309

(51) Int. Cl.
*C01B 31/30*    (2006.01)
(52) U.S. Cl. ..................................... 423/382
(58) Field of Classification Search ............... 423/440, 423/380, 382
See application file for complete search history.

(56) References Cited

U.S. PATENT DOCUMENTS

| | | | | |
|---|---|---|---|---|
| 4,247,529 A | * | 1/1981 | Mori et al. ................. 423/371 |
| 4,758,451 A | * | 7/1988 | van den berg et al. . 427/249.15 |
| 4,812,301 A | * | 3/1989 | Davidson et al. ............ 423/440 |
| 5,102,646 A | * | 4/1992 | Bienvenu ..................... 423/439 |
| 5,250,278 A | * | 10/1993 | Schuette et al. ............. 423/346 |
| 5,417,952 A | * | 5/1995 | Koc et al. .................... 423/380 |
| 5,484,751 A | * | 1/1996 | Colombier et al. ........... 501/87 |
| 5,756,410 A | * | 5/1998 | Dunmead et al. .......... 501/96.1 |
| 6,921,510 B1 | * | 7/2005 | Ott et al. ...................... 419/10 |

* cited by examiner

Primary Examiner—Stuart L. Hendrickson
Assistant Examiner—Alvin T Raetzsch
(74) Attorney, Agent, or Firm—Cooper & Dunham LLP

(57) ABSTRACT

Disclosed herein is a method for economically manufacturing high quality TiC powder, TiCN powder or ultrafine nanophase TiC+Ni (Co, Al) and TiCN+Ni (Co, Al) composite powders by means of metallothermic reduction. The method comprises the steps of preparing a starting solution of titanium tetrachloride ($TiCl_4$) in a carbon chloride, feeding the starting solution into a closed container containing molten magnesium (Mg) under inert atmosphere, vacuum-separating unreacted liquid-phase Mg and magnesium chloride ($MgCl_2$) remaining after reduction of magnesium from the closed container, and collecting a TiC compound from the closed container.

TiC powder, TiCN powder or ultrafine nanophase TiC+Ni (Co, Al) and TiCN+Ni (Co, Al) composite powders having a particle size of a few tens nm can be manufactured in a simpler manner using economically advantageous starting materials such as titanium tetrachloride and carbon chlorides.

7 Claims, 12 Drawing Sheets

FIG. 3A
FIG. 3B
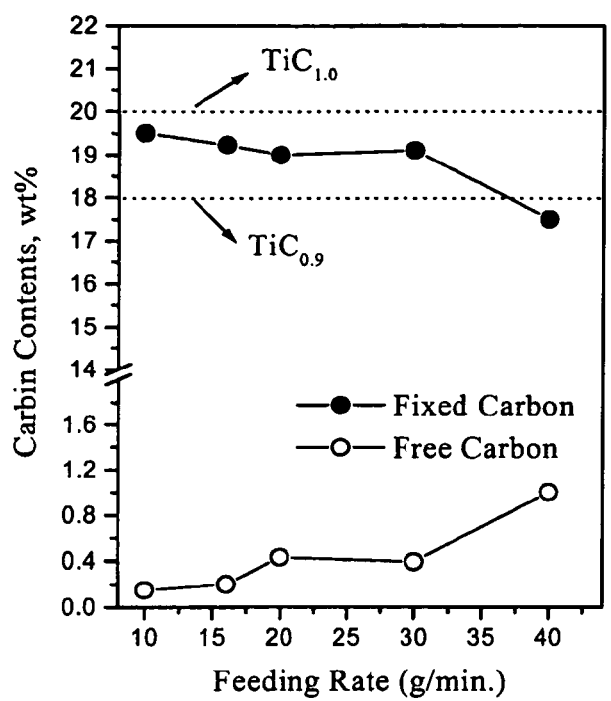
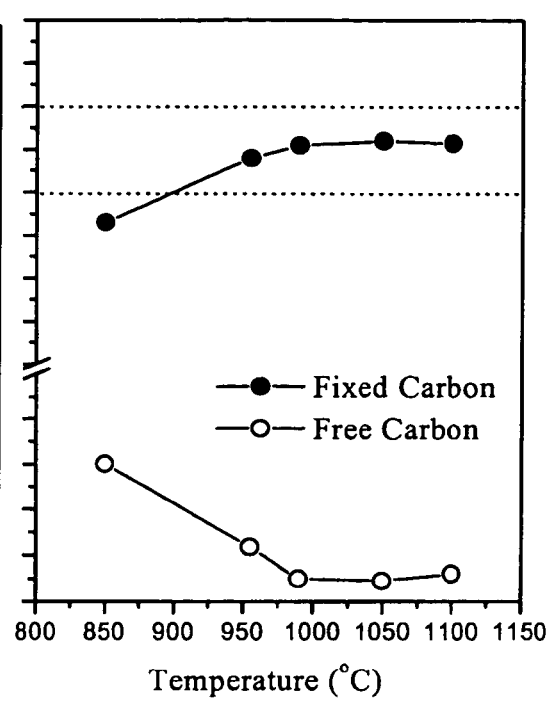

FIG. 9

| Sample No. | Initial reducing agents | C | | | Fe | Mg | Cl | O | Ni | Ti | Form of TiC |
|---|---|---|---|---|---|---|---|---|---|---|---|
| | | total | fix | free | | | | | | | |
| 1 | Mg-5%Ni | 13.8 | 13.5 | 0.3 | 2.73 | 0.25 | 0.32 | 0.8 | 19.8 | Bal. | $TiC_{0.89}$ |
| 2 | Mg-12%Ni | 12.0 | 11.8 | 0.2 | 2.20 | 0.18 | 0.32 | 0.9 | 31.5 | Bal. | $TiC_{0.91}$ |
| 3 | Mg-18%Ni | 10.2 | 10.0 | 0.2 | 3.10 | 0.22 | 0.28 | 0.9 | 40.2 | Bal. | $TiC_{0.91}$ |
| 4 | Mg-12%Co | 11.8 | 11.3 | 0.5 | 2.80 | 0.15 | 0.15 | 0.6 | 35.3 | Bal. | $TiC_{0.92}$ |
| 5 | Mg-12%Al | 11.2 | 11.0 | 0.2 | 3.38 | 0.20 | 0.18 | 0.9 | 34.7 | Bal. | $TiC_{0.88}$ |
| 6 | Mg-12%Ni | 11.8 | 12.4 | 0.4 | 2.50 | 0.22 | 0.32 | 0.6 | 32.5 | Bal. | $TiC_{0.5}N_{0.5}$ |
| 7 | Mg-12%Co | 12.1 | 12.3 | 0.4 | 2.60 | 0.24 | 0.18 | 0.6 | 34.4 | Bal. | $TiC_{0.5}N_{0.5}$ |
| 8 | Mg-12%Al | 11.5 | 12.0 | 0.3 | 3.45 | 0.25 | 0.17 | 0.8 | 35.1 | Bal. | $TiC_{0.5}N_{0.5}$ |

\* Sample Nos. 6 to 8 were maintained under inert atmosphere

METHOD FOR MANUFACTURING NANOPHASE TIC-BASED COMPOSITE POWDERS BY METALLOTHERMIC REDUCTION

BACKGROUND OF THE INVENTION

1. Field of the Invention

The present invention relates to a method for manufacturing nanophase TiC-based composite powders by means of metallothermic reduction, and more particularly to a method for economically manufacturing high quality TiC powder, TiCN powder or ultrafine nanophase TiC+Ni (Co, Al) and TiCN+Ni (Co, Al) composite powders by means of metallothermic reduction.

2. Description of the Related Art

In general, titanium carbide (TiC) and titanium carbonitride (TiCN) powders are currently used as additives for improving high-temperature hardness and wear-resistance of WC/Co hard metal tools. In addition, these powders are widely used as starting powders for manufacturing cermet tools, rolls and molds by forming composites with metal powders, e.g., Ni powder.

As traditional processes for manufacturing TiC and TiCN powders, reduction/carburization of titanium dioxide ($TiO_2$), direct carburization of Ti and $TiH_2$, self heated sintering processes, sol-gel processes and mechanical alloying (MA) processes, etc., have been developed.

These processes have difficulty in their commercial uses due to the following problems.

That is, the reduction/carburization of titanium dioxide requires a very high reaction temperature of as high as 2000° C., which is economically disadvantageous. Since the direct carburization using Ti and $TiH_2$ and self heated sintering processes use an expensive starting material (high purity sponge titanium powder), there is a problem of high manufacturing costs. The sol-gel process and the mechanical alloying (MA) process have problems of difficult stoichiometric manufacturing of TiC and TiCN powders and serious impurity incorporation during manufacture of TiC and TiCN powders, etc.

In addition, according to the above-mentioned processes, since finally manufactured powders are often obtained in the form of oxides such as $TiC_xO_y$ or $TiC_xN_yO_z$, there is a difficulty in the manufacture of desired high quality powders. Furthermore, the processes require a separate grinding step, such as re-milling, to obtain a desired particle size, owing to severe sintering of TiC by high reaction temperature.

SUMMARY OF THE INVENTION

Therefore, the present invention has been made in view of the above problems, and it is an object of the present invention to provide a method for manufacturing TiC powder, TiCN powder, or nanophase TiC and TiCN composite powders containing Ni, Co and Al as alloy elements by means of metallothermic reduction, wherein the method comprises preparing a starting solution of titanium tetrachloride in a carbon chloride, and feeding the starting solution into magnesium or molten magnesium alloy as a reducing agent to remove magnesium chloride obtained by the reaction of magnesium with chlorine of the starting solution.

In order to accomplish the above object of the present invention, there is provided a method for manufacturing nanophase TiC-based composite powders by means of metallothermic reduction, comprising the steps of:

preparing a starting solution of titanium tetrachloride ($TiCl_4$) in a carbon chloride;

feeding the starting solution into a closed container containing molten magnesium (Mg) under inert atmosphere;

vacuum-separating unreacted liquid-phase Mg and magnesium chloride ($MgCl_2$) remaining after reduction of magnesium from the closed container; and collecting a TiC compound from the closed container.

In the step of preparing a starting solution of titanium tetrachloride ($TiCl_4$) in a carbon chloride, carbon tetrachloride ($CCl_4$) or tetrachloroethylene ($C_2Cl_4$) may be used as the carbon chloride.

In addition, in the step of preparing a starting solution of titanium tetrachloride ($TiCl_4$) in a carbon chloride, the carbon chloride ($CCl_4$ or $C_2Cl_4$) may be used in an amount of 1.05~1.15 moles, relative to one mole of titanium tetrachloride ($TiCl_4$).

In the step of feeding the starting solution into a closed container containing molten magnesium (Mg) under inert atmosphere, the feeding of the starting solution may be controlled at a rate of 10~20 g/min.

Preferably, the inert atmosphere of the closed container containing molten magnesium (Mg) is created by heating at 200° C. under vacuum for 1 hour, feeding argon gas at 1.1 atm, and heating to a temperature of above 850° C.

Preferably, the molten magnesium (Mg) contained in the closed container under inert atmosphere may be used in an amount of 8~14 moles, relative to one mole of the starting solution.

Preferably, the molten magnesium (Mg) contained in the closed container under inert atmosphere may further include at least one metal selected from nickel (Ni), cobalt (Co) and aluminum (Al).

In accordance with the present invention, there is provided a method for manufacturing nanophase TiC-based composite powders by means of metallothermic reduction, comprising the steps of:

preparing a starting solution of titanium tetrachloride ($TiCl_4$) in a carbon chloride;

feeding the starting solution into a closed container containing molten magnesium (Mg) under nitrogen ($N_2$) atmosphere;

vacuum-separating unreacted liquid-phase Mg and magnesium chloride ($MgCl_2$) remaining after reduction of magnesium from the closed container; and collecting a TiCN compound from the closed container.

In the step of preparing a starting solution of titanium tetrachloride ($TiCl_4$) in a carbon chloride, carbon tetrachloride ($CCl_4$) or tetrachloroethylene ($C_2Cl_4$) may be used as the carbon chloride.

In addition, in the step of preparing a starting solution of titanium tetrachloride ($TiCl_4$) in a carbon chloride, the carbon chloride ($CCl_4$ or $C_2Cl_4$) may be used in an amount of 1.05~1.15 moles, relative to one mole of titanium tetrachloride ($TiCl_4$).

In the step of feeding the starting solution into a closed container containing molten magnesium (Mg) under inert atmosphere, the feeding of the starting solution may be controlled at a rate of 10~20 g/min.

Preferably, the inert atmosphere of the closed container containing molten magnesium (Mg) is created by heating at 200° C. under vacuum for 1 hour, feeding nitrogen ($N_2$) gas at 1.1 atm, and heating to a temperature of above 900° C.

Preferably, the molten magnesium (Mg) contained in the closed container under inert atmosphere may be used in an amount of 8~14 moles, relative to one mole of the starting solution.

Preferably, the molten magnesium (Mg) contained in the closed container under inert atmosphere may further include at least one metal selected from nickel (Ni), cobalt (Co) and aluminum (Al).

BRIEF DESCRIPTION OF THE DRAWINGS

The above and other objects, features and other advantages of the present invention will be more clearly understood from the following detailed description taken in conjunction with the accompanying drawings, in which:

FIG. 3 is graphical representations showing the contents of free carbon and fixed carbon at various feeding rates of a starting solution into molten magnesium and various reaction temperatures, in the manufacture of TiC powder in accordance with the present invention;

FIG. 9 is a table showing the results of the chemical element analysis of TiC—Ni composite powder according to changes in initial nickel contents of molten magnesium-nickel, in the manufacture of TiC—Ni composite powder in accordance with the present invention;

DESCRIPTION OF THE PREFERRED EMBODIMENTS

Hereinafter, the present invention will be explained in more detail with reference to the accompanying drawings.

The method according to the present invention is a modification of the conventional process for manufacturing sponge titanium, represented by the following reaction 1:

$$TiCl_4 + 2Mg \rightarrow Sponge\ Ti + 2MgCl_2 \quad (1)$$

That is, the method according to the present invention uses a starting solution of $TiCl_4$ in tetrachloroethylene ($C_2Cl_4$) or carbon tetrachloride ($CCl_4$), instead of single component $TiCl_4$. Titanium, separated from $TiCl_4$ by strong reducing power of magnesium, is bonded to a carbon atom, thereby forming TiC compound.

Tetrachloroethylene ($C_2Cl_4$) used herein is also called ethylene tetrachloride or perchloroethylene. Physical properties of tetrachloroethylene ($C_2Cl_4$) are as follows: m.p: −19° C., b.p: 121° C. and specific gravity: 1.620. Tetrachloroethylene ($C_2Cl_4$) is slightly soluble in water and nonflammable. Tetrachloroethylene ($C_2Cl_4$) is used as a solvent for degreasing metals and a solvent for extracting fats, resins, rubbers, etc. Carbon tetrachloride ($CCl_4$) is a colorless liquid and has the following physical properties: m.p: −22.86° C., b.p: 76.679° C. and specific gravity: 1.542. Carbon tetrachloride ($CCl_4$) is used as a solvent for extracting fats.

In order to manufacture TiCN, nitrogen ($N_2$) gas is used for creating an atmosphere of the closed container containing molten magnesium. In addition, Mg—Ni (Co, Al) alloy is used to manufacture a TiC+Ni (Co, Al) composite or a TiCN+Ni (Co, Al) composite as a reducing agent, instead of pure magnesium.

On the other hand, the crystal structure of $TiC_x$ is cubic in x ranging from 0.54 to 1, but the hardness of $TiC_x$ increases linearly as x closes to the stoichiometric ratio.

Accordingly, the amount of fixed carbon for industrial application of cermet tools must satisfy the condition that x is above 0.9 ($TiC_{0.9}$), and the amount of free carbon is limited below 1%.

In the traditional processes for manufacturing sponge titanium, since $MgCl_2$ is more thermodynamically stable than $TiCl_4$ over a wide range of temperatures exceeding the melting temperature of magnesium (690° C.), the sponge titanium is easily manufactured by a simple reduction of Mg. In the present invention, however, complex reduction of $TiCl_4$ and $C_xCl_4$, and bonding between carbon and titanium in the stoichiometric ratio take place simultaneously.

Process variables affecting the stoichiometric ratio are composition of the starting solution, reaction temperature (temperature of the molten magnesium) and feeding rate of the starting solution. By optimally controlling the process variables in the present invention, the nanophase TiC-based composite powders are manufactured.

Figure 2:
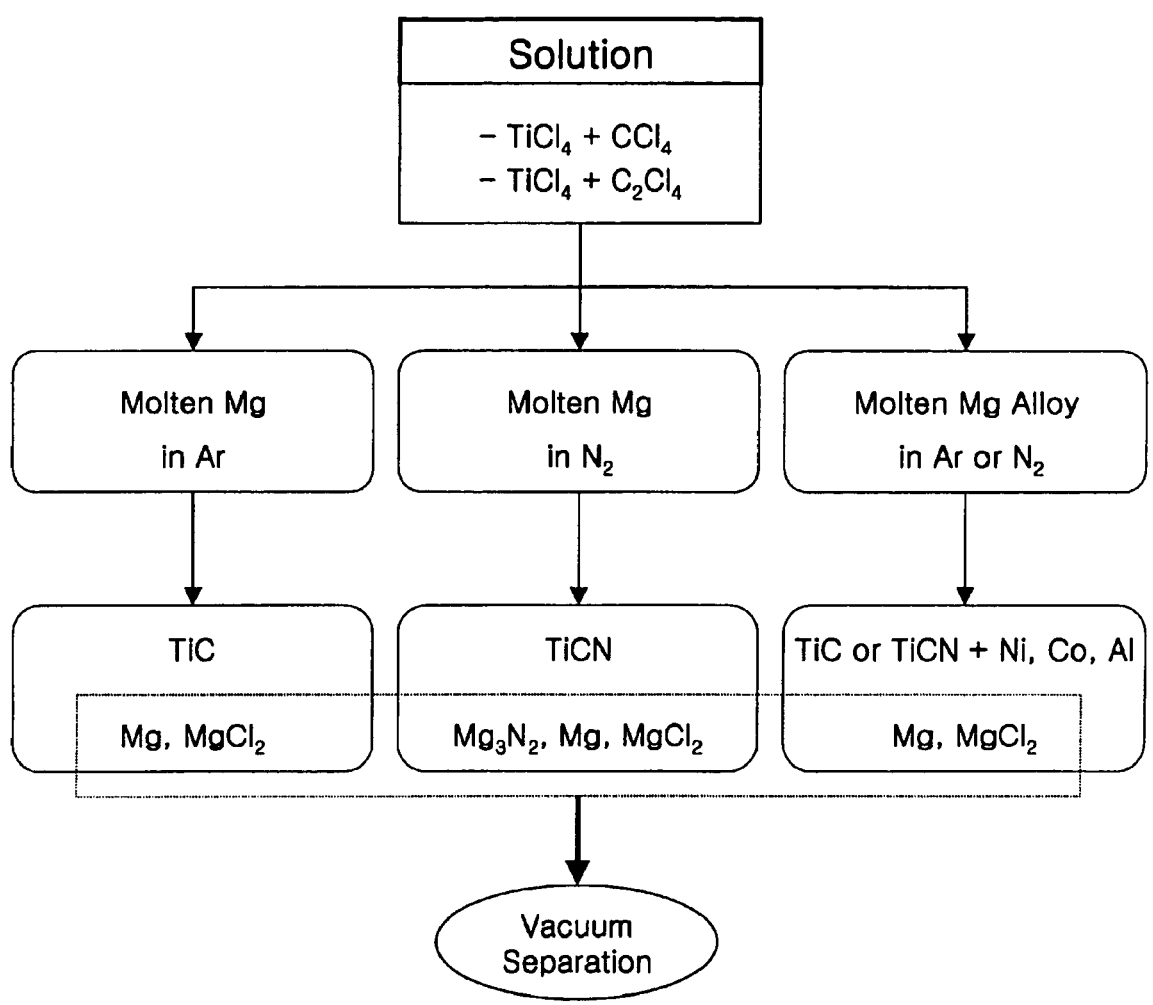
FIG. 2 is a process chart of a method for manufacturing nanophase TiC-based composite powders by means of metallothermic reduction according to the present invention.

That is, the starting solution of $TiCl_4$ in $CCl_4$ (or $C_2Cl_4$) is fed into the closed container containing molten Mg alloy of at least one metal selected from cobalt (Co), aluminum (Al) and nickel (Ni). At this step, argon or nitrogen gas is used to create the atmosphere of the closed container. The overall reaction is schematically shown in FIG. 2.

The advantages of the method for manufacturing nanophase TiC-based composite powders by means of metallothermic reduction according to the present invention is that $MgCl_2$ is more thermodynamically stable than $TiCl_4$ or $C_xCl_4$, and TiC compound is more thermodynamically stable than a mixture of Ti and C.

Figure 1:
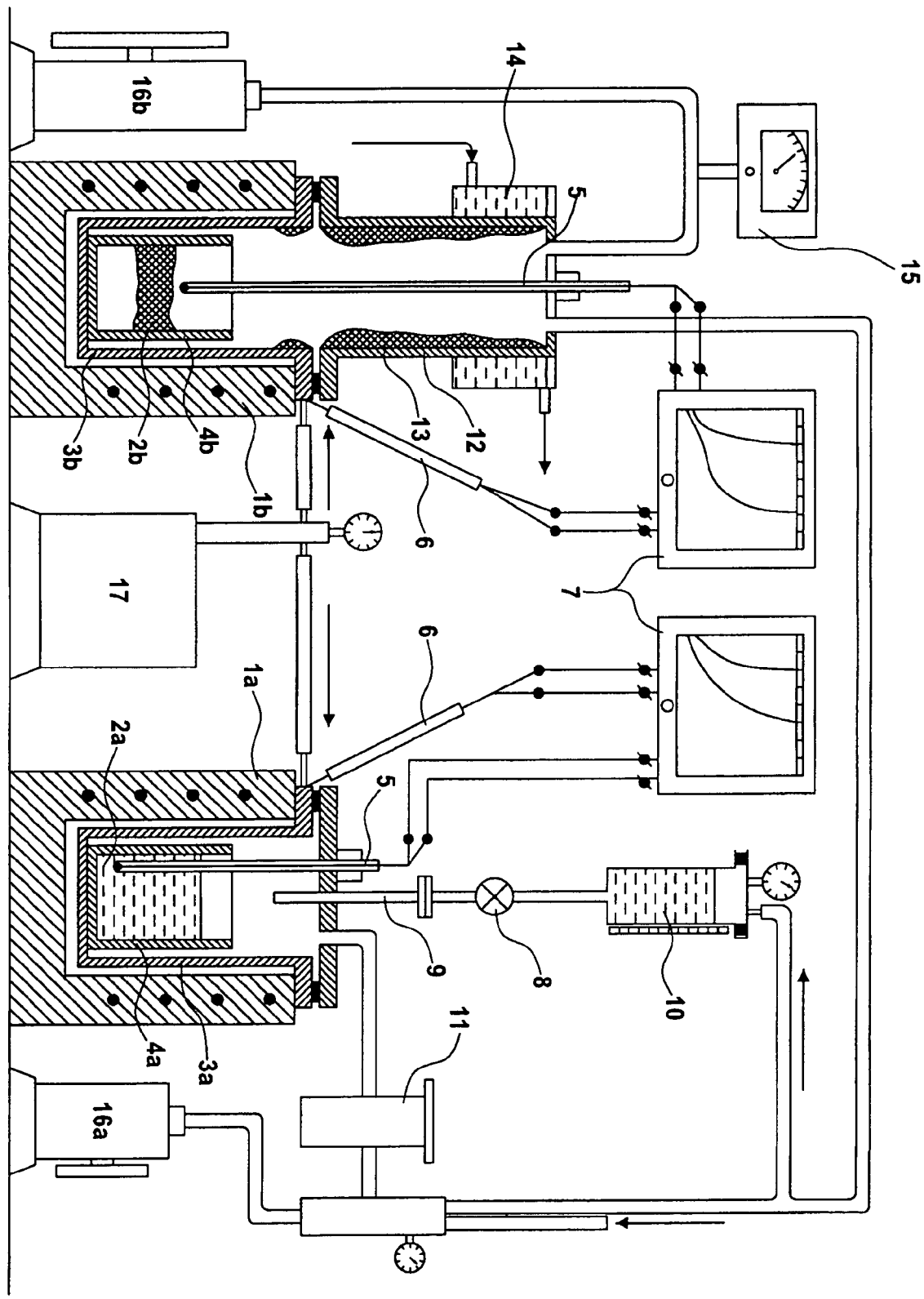
FIG. 1 is a schematic diagram showing an apparatus for manufacturing nanophase TiC-based composite powders by means of metallothermic reduction in accordance with the present invention.

Referring to FIG. 1, an apparatus for manufacturing nanophase TiC-based composite powders by means of metallothermic reduction in accordance with the present invention is explained in detail below.

As shown in FIG. 1, the apparatus includes a pair of electric furnaces 1a and 1b disposed at left and right sides of the apparatus. A reduction system includes the right electric furnace 1a, and a vacuum-separation system includes the left electric furnace 1b is.

After reduction is completed in the reduction system in the reduction system, a reactor 4a is cooled and then transferred to the electric furnace 1b of the vacuum-separation system, where Mg and $MgCl_2$ in the form of gas are removed.

Hereinafter, the reduction system will be described. The electric furnace 1a is connected to a valve 8 through a solution supply tube 9, which penetrates through a cover. The valve 8 is connected to a solution tank 10 containing a starting solution of titanium tetrachloride in a carbon chloride and discharges the starting solution into the reactor 4a.

The electric furnace 1a is connected to a cyclone 11 for supplying gas to the reactor 4a and a vacuum pump 16a for evacuating air in the electric furnace 1a.

Thermocouples 5 and 6 for detecting the temperatures of the cover and molten magnesium 2 contained in the electric furnace 1a are connected to one of thermometers 7.

First, the reactor 4a containing a magnesium lump is placed in the electric furnace 1a, after which the cover is closed to the electric furnace. The reactor 4a is evacuated at a constant level by driving the vacuum pump 16a. An inert gas is fed into the electric furnace 1a from the cyclone 11 so that a predetermined pressure is maintained in the electric furnace 1a. Thereafter, the electric furnace 1a is heated to the extent that the magnesium lump is completely molten.

The valve 8 is opened so that the starting solution in the solution bath 10 is fed into molten magnesium 2a to bring out the reduction of magnesium in the reactor 4a.

After the reduction is completed, unreacted Mg and molten $MgCl_2$ fall into the bottom of the reactor 4a and are collected. Since Mg and $MgCl_2$ thus colleted are not miscible with each other due to the difference in their specific gravities, it is easy to separate them. Only Mg is recycled.

After Mg and $MgCl_2$ are removed from the reactor 4a, only a very small amount of Mg and $MgCl_2$ is entrapped in the inner pores of the manufactured TiC sponge block. The very small amount of Mg and $MgCl_2$ is finally vacuum-separated from the reactor 4a as follows.

The reactor 4a of the reduction system is cooled and then transferred to the electric furnace 1b of the vacuum-separation system. The liquid-phase Mg and $MgCl_2$ are evaporated at a temperature of 900~1000° C. and at a pressure of $10^{-2}$ torr, and condensed at the inner wall of a condenser 12 into which a cooling water 14 flows. The condensed Mg and $MgCl_2$ are collected. Since Mg and $MgCl_2$ thus colleted are not miscible with each other due to the difference in their specific gravities at 1000° C., it is easy to separate them. Only Mg is recycled.

The apparatus is manufactured for experimental purposes only and is not limited thereto. Accordingly, those skilled in the art will appreciate that various modifications are possible in accordance with the method according to the present invention.

Several process variables and value limitations thereof will be described in detail below with reference to preferred Examples of the present invention.

EXAMPLE 1

This Example describes a method for manufacturing TiC by means of metallothermic reduction. This Example was based on the following reaction 2.

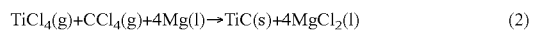
$TiCl_4(g)+CCl_4(g)+4Mg(l) \rightarrow TiC(s)+4MgCl_2(l)$ (2)

The purities of $TiCl_4$ and $CCl_4$ were 99.9%. First, 1 mole (189.7 g) of $TiCl_4$ was prepared. Since the boiling point of $CCl_4$ is lower than that of $TiCl_4$, that is, more volatile, $CCl_4$ is first evaporated. Accordingly, some amount of $CCl_4$ was condensed at the inner wall of a reactor and thus did not react with molten magnesium. This lowered the content of fixed carbon in final TiC compound.

To avoid this disadvantage, 1.05 moles (157.3 g) of $CCl_4$ was set as a minimum amount and 1.15 moles (172.3 g) of $CCl_4$ was set as a maximum amount, relative to the stoichiometric ratio (149.8 g) with $TiCl_4$.

The purity of magnesium, a reducing agent of a starting solution of titanium tetrachloride in carbon tetrachloride, was 99.9%. Although 4 moles of magnesium corresponds to 97.3 g, a sufficient amount of magnesium was prepared in this Example assuming that 30~60% (reaction coefficient of magnesium=0.3~0.6) of molten magnesium participating in the reduction. This is because formation of an intermediate phase such as $TiCl_2$ or $TiCl_3$ due to incomplete reduction is possible.

Herein, the molten magnesium was used in the amount of 8~14 moles, relative to one mole of titanium tetrachloride. This range of molten magnesium was limited because the reaction coefficient of magnesium participating in the reduction was 0.3~0.6.

After the magnesium lump was placed in a closed container made of mild steel, the closed container was evacuated, heated to 200° C. for 1 hour, fed with argon at 1.1 atm, and finally heated to a desired temperature (850~1000° C.).

5 minutes after the temperature of the closed container containing the magnesium lump reached the desired temperature, the starting solution was fed into the closed container by a mechanical pump. At this step, the feeding rate of the starting solution was in the range of 10~40 g/min.

The boiling points of $TiCl_4$ and $CCl_4$ are 136° C. and 78° C., respectively. Accordingly, as soon as the starting solution was fed into the closed container maintained at high temperature, the starting solution was evaporated in a short time and thus the reduction mainly occurred on the surface of the molten magnesium.

That is, on the surface of molten magnesium, $MgCl_2$ was formed and simultaneously sponge TiC was manufactured through vigorous reaction between free titanium and atomic carbon. When a sufficient amount of the sponge TiC was formed on the surface of molten magnesium, the sponge TiC settled on the bottom of the closed container. The settlement of the sponge TiC was continued until the reaction was completed.

After the reaction was completed, the Tic compound in the form of sponge block coexisted with a mixture of liquid-phase Mg and $MgCl_2$ in the closed container. The remaining liquid-phase Mg and $MgCl_2$ were vacuum-separated from the closed container at $10^{-2}$ torr for 3 hours using a mechanical pump.

The porous TiC compound obtained after the vacuum-separation was easily ground manually using a ceramic mortar. The contents of fixed carbon and free carbon in the obtained TiC powder were measured. The amount of free carbon was determined by dissolving the TiC powder in a mixture of nitric acid and hydrofluoric acid, followed by filtration. The amount of fixed carbon was calculated by subtracting the amount of free carbon from the total amount of carbon.

Changes in the contents of free carbon and fixed carbon at various feeding rates of the starting solution into molten magnesium and various reaction temperatures are shown in FIG. 3. As shown in FIG. 3, when the feeding rate of the starting solution was below 20 g/min and the reaction temperature was above 1000° C., the content of free carbon in the TiC compound decreased to a level of as low as 0.2%, thereby manufacturing high quality TiC compound such as $TiC_{0.96}$.

As other impurities, Fe, Mg, Cl and O were present in the amounts of 0.1~0.6 wt %, 0.3~0.8 wt %, 0.1~0.3 wt % and 0.5~1.3 wt %, respectively, regardless of experimental conditions.

Figure 4:
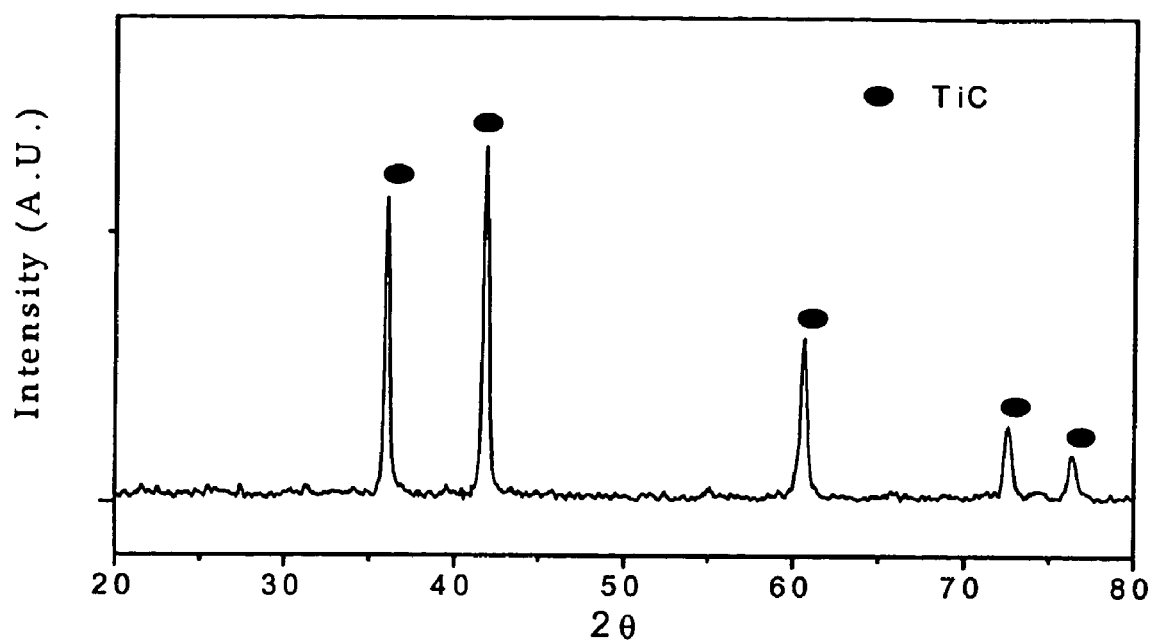
FIG. 4 is an X-ray diffraction pattern from TiC powder manufactured in accordance with the present invention.

FIG. 4 shows an X-ray diffraction pattern from a TiC compound manufactured under conditions of a temperature of 1009° C. and a feeding rate of 10 g/min. The X-ray diffraction pattern from the TiC compound was observed to be clear. The lattice constant of the TiC compound was 4.3267 Å.

The TiC compound was in the form of porous sponge. The TiC compound could be easily ground manually using a ceramic mortar. Scanning electron microscopic images of the TiC compound are shown in FIG. 5.

Figure 5A:
FIG. 5 is scanning electron microscopic images showing TiC powder manufactured in accordance with the present invention.
Figure 5B:
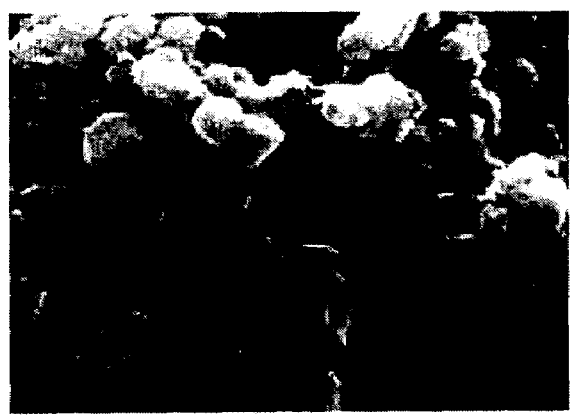

As can be seen from FIG. 5(A), porous macroparticles of the TiC compound were ground to fine particles. The fine particles were shown to have an aggregated structure of crystals having a particle size of about 50 nm (FIG. 5B).

In the case where $C_2Cl_4$ was used instead of $CCl_4$, the reaction was as follows:

$$TiCl_4(g) + \tfrac{1}{2}C_2Cl_4(g) + 3Mg(l) \rightarrow TiC(s) + 3MgCl_2(l) \quad (3)$$

According to the reaction 3, the amount of magnesium was decreased by ¾, and the amount of tetrachloroethylene was decreased by ½, which was economically advantageous.

Figure 5C:
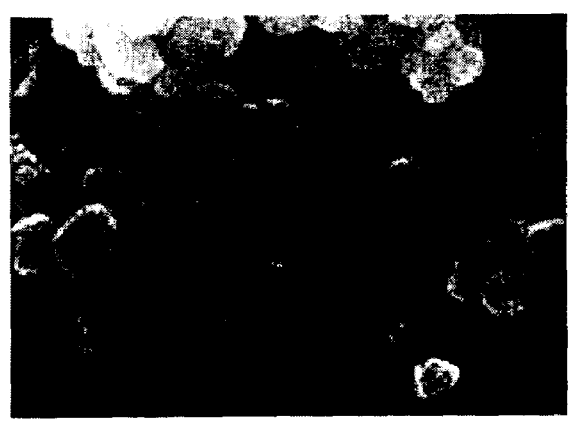

A Tic compound was manufactured in the same manner as in the above conditions except that a solution of $TiCl_4$ in tetrachloroethylene ($C_2Cl_4$) was used as a starting solution. Scanning electron microscopic image under high power magnification of the TiC compound thus manufactured showed that the TiC compound had an aggregated structure of crystals having a particle size of about 50 nm (FIG. 5C). The contents of fixed carbon, free carbon and other impurities in the TiC compound were similar to those in the case of using $CCl_4$.

EXAMPLE 2

This Example describes a method for manufacturing TiCN by means of metallothermic reduction. Specifically, a TiCN compound having a composition $TiC_{0.5}N_{0.5}$ was manufactured in the same manner as in Example 1 except that a solution of $TiCl_4$ in $C_2Cl_4$ was used as a starting solution and nitrogen ($N_2$) gas was used to create the atmosphere of a closed container instead of argon (Ar) gas.

The TiCN compound having a composition $TiC_{0.5}N_{0.5}$ was manufactured, based on the following reaction 4:

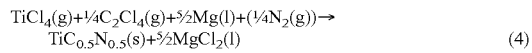

$$TiCl_4(g) + \tfrac{1}{4}C_2Cl_4(g) + \tfrac{5}{2}Mg(l) + (\tfrac{1}{4}N_2(g)) \rightarrow$$
$$TiC_{0.5}N_{0.5}(s) + \tfrac{5}{2}MgCl_2(l) \quad (4)$$

Figure 6A:
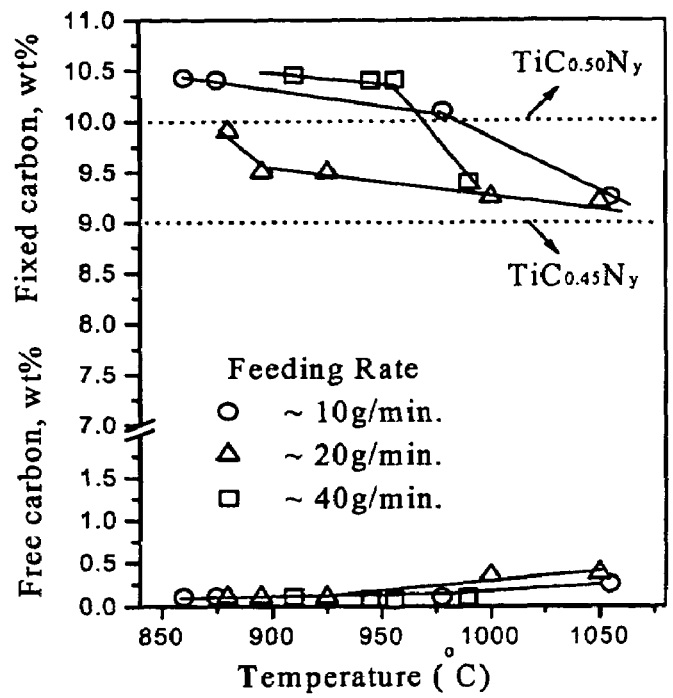
FIG. 6 is graphical representations showing the contents of free carbon, fixed carbon and fixed nitrogen at various feeding rates of a starting solution into molten magnesium and various reaction temperatures, in the manufacture of TiCN powder in accordance with the present invention.
Figure 6B:
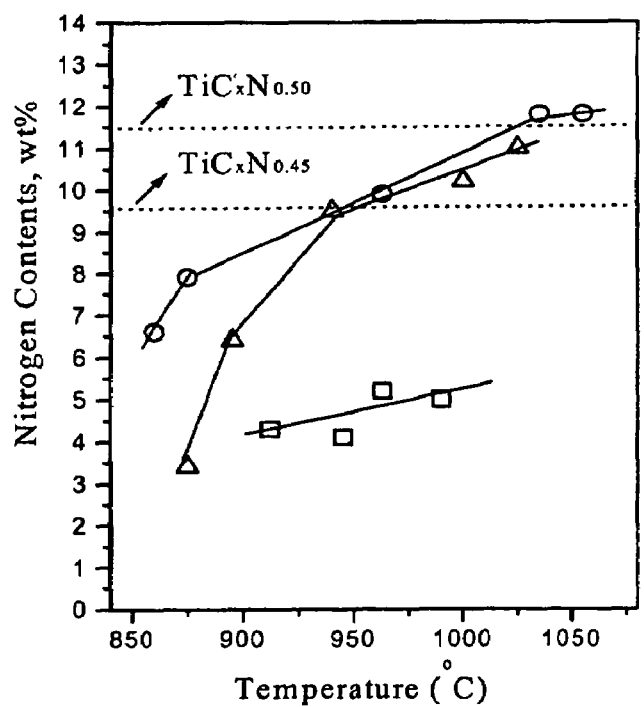

$TiCl_4$, $C_2Cl_4$ and Mg were used in the amounts of 189.7 g, 87.0 g and 250 g, respectively. Changes in the contents of free carbon, fixed carbon and fixed nitrogen at various feeding rates of the starting solution into molten magnesium and various reaction temperatures are shown in FIG. 6.

When Ti, separated by the reduction of Mg, was bonded to ½C. atom, bonding with a nitrogen atom followed, unlike in the manufacture of TiC. As shown in FIG. 6, as the reaction temperature increased and the feeding rate of the starting solution decreased, the amount of fixed nitrogen increased. At a temperature of above about 1000° C. and a feeding rate of below 20 g/min, the amount of fixed nitrogen reached its maximum value ($TiC_xN_{0.5}$).

The amount of free carbon was extremely low as at the level of $TiC_{0.45-0.55}N_y$ under all reaction conditions.

Although not significantly changed, the amount of fixed carbon decreased slightly with increasing reaction temperature, while the amount of free carbon increased slightly. This is due to low bonding of nitrogen during reduction at low reaction temperatures.

For example, a $TiC_{0.5}N_{0.3}$ compound, which has a number of octahedral vacancies, was manufactured at a low reaction temperature. The octahedral vacancies help free carbons to easily diffuse into non-stoichiometric TiC during vacuum-separation. This suggests low content of free carbon in a final TiCN compound, unlike in a TiC compound.

The amounts of other impurities were similar to those in the case of manufacturing TiC.

Since nitrogen gas was used to create the atmosphere of the closed container, solid $Mg_3N_2$ powder was formed on the surface of molten magnesium prior to reduction. The solid $Mg_3N_2$ powder did not any effect on the manufacture of TiCN. After the reduction, the solid $Mg_3N_2$ powder was present in the manufactured TiCN compound. Thereafter, the solid $Mg_3N_2$ powder was decomposed into Mg and $N_2$ during vacuum-separation, and finally removed.

Figure 7A:
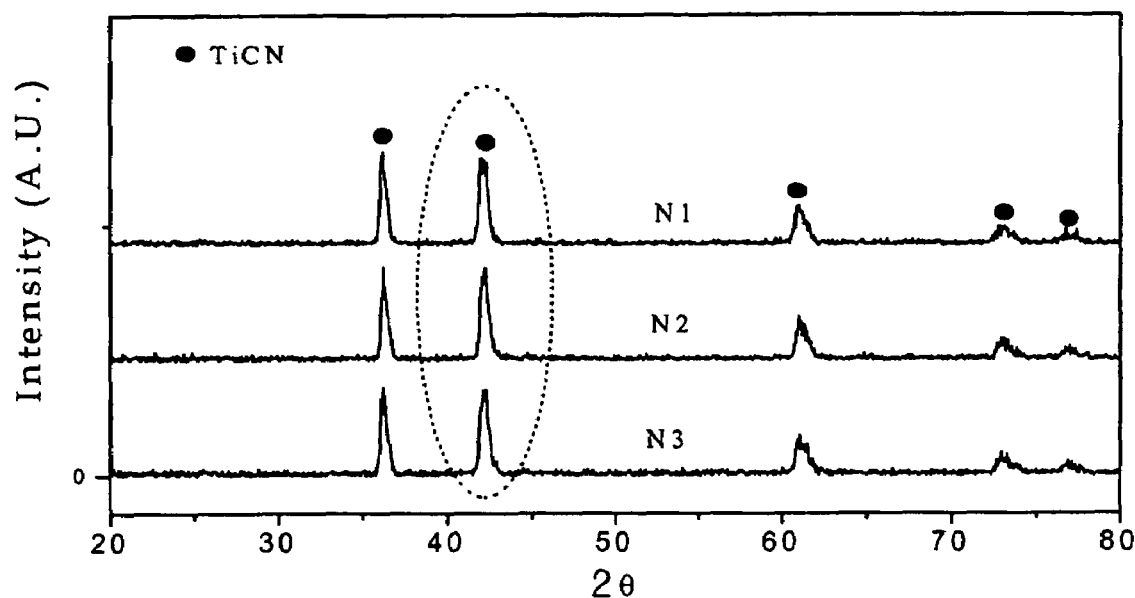
FIG. 7 is X-ray diffraction patterns from TiCN powder manufactured in accordance with the present invention.
Figure 7B:
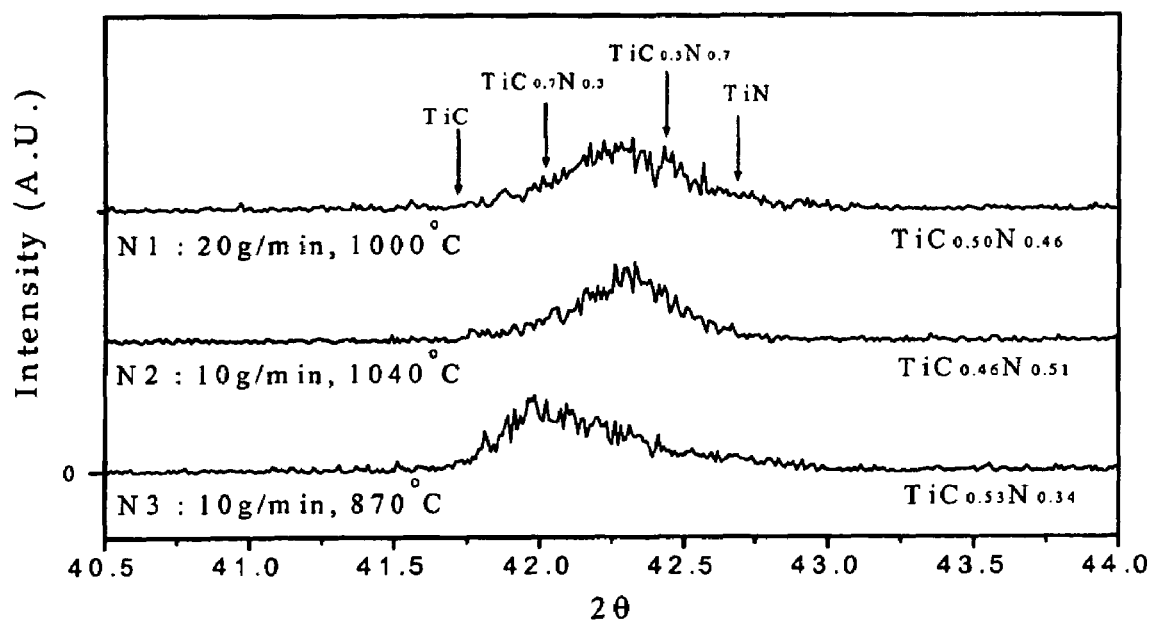
Figure 8A:
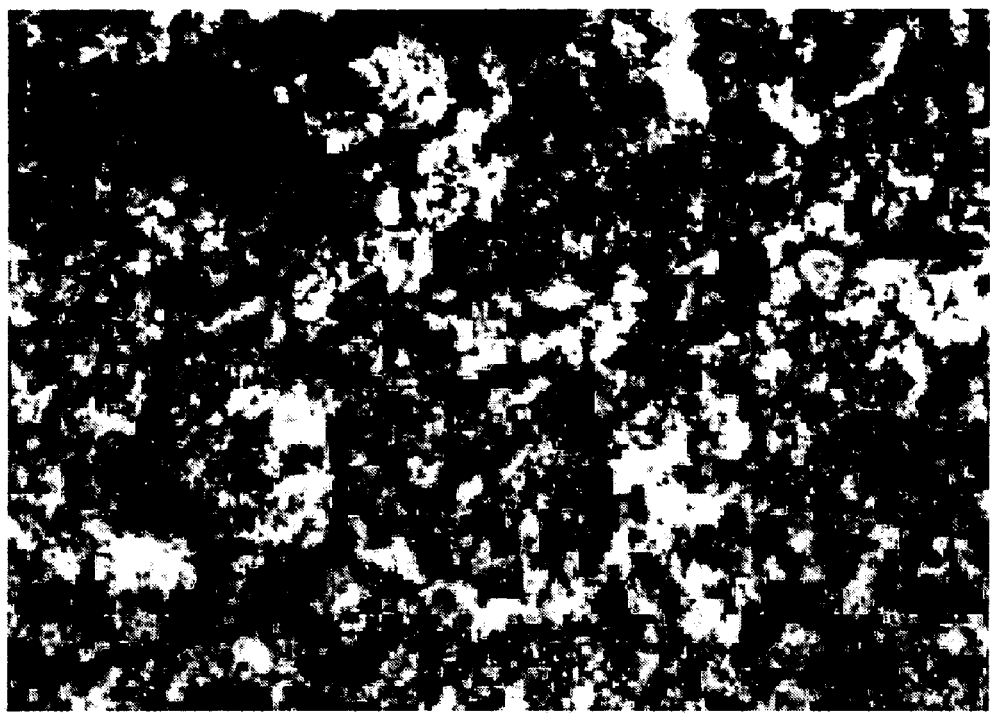
FIG. 8 is scanning electron microscopic images showing TiCN powder manufactured in accordance with the present invention.
Figure 8B:

X-ray diffraction patterns from the manufactured TiCN compound manufactured are shown in FIG. 7. As shown in FIG. 7, as the reaction temperature increased and the feeding rate of the starting solution decreased, the TiCN compound exhibited contents of fixed nitrogen and fixed carbon as high as $TiC_{0.5}N_{0.5}$. In addition, as the content of fixed nitrogen in the TiCN compound was decreased, the diffraction peak shifted slightly toward TiC. The TiCN compound was shown to have an aggregated structure of crystals having a particle size of about 50 nm (FIG. 8).

On the other hand, nanoparticles of the TiCN compound had better dispersion compared to TiC particles. This is due to low surface energy of the TiCN compound compared to that of the TiC compound.

EXAMPLE 3

This Example describes a method for manufacturing a TiC+Ni (Al, Co) composite or TiCN+Ni (Al, Co) composite by means of metallothermic reduction.

Specifically, the TiC+Ni composite was manufactured in the same manner as in Examples 1 and 2 (e.g., reaction temperature: above 1000° C. and feeding rate: below 20 g/min) except that molten magnesium alloy including at least one metal selected from nickel (Ni), aluminum (Al) and cobalt (Co) was used instead of pure magnesium. In this Example, molten Mg—Ni alloy was used as a reducing agent.

The TiC+Ni composite was manufactured, based on the following reaction 5:

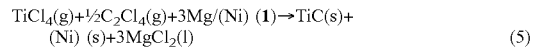

$$TiCl_4(g) + \tfrac{1}{2}C_2Cl_4(g) + 3Mg/(Ni) \, (l) \rightarrow TiC(s) +$$
$$(Ni) \, (s) + 3MgCl_2(l) \quad (5)$$

Referring to the reaction 5, since Al or Co can be used instead of Ni, a TiC(s)+Al(s) composite or TiC(s)+Co(s) composite can be manufactured. In addition, in the case where nitrogen gas was used to create the atmosphere of the closed container, TiCN(s)+Al, Ni, Co(s) composites can be manufactured.

When the content of nickel in initial molten alloy was changed to 5, 12 and 18 wt %, the amount of fixed carbon in the manufactured composites was at a level of $TiC_{0.9}$. The content of nickel was further changed to 20, 30 and 40 wt % (FIG. 9).

The content of nickel in the manufactured composites can be controlled by changing the content of Ni in initial molten Mg—Ni alloy. Only Mg in the molten Mg—Ni alloy contributed to the reduction of the starting solution. Once a TiC compound was manufactured, the TiC compound was uniformly wetted with liquid-phase Mg, Ni and $MgCl_2$.

After the reduction was completed, Mg and $MgCl_2$ were vacuum-separated and Ni still remained due to the difference in their vapor pressures.

Figure 10A:
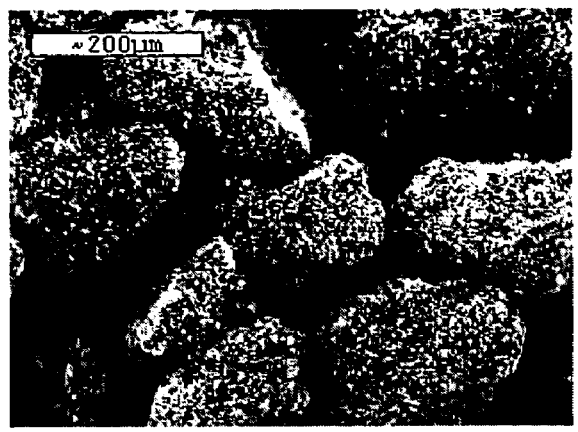
FIG. 10 is electron microscopic images showing the results of the chemical element analysis of TiC—Ni composite powder manufactured in accordance with the present invention.
Figure 10B:
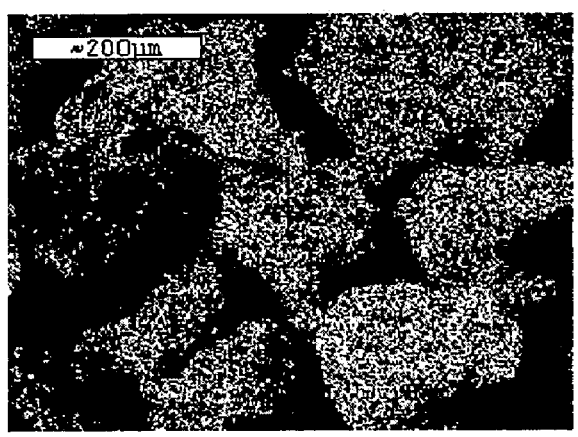
Figure 10C:
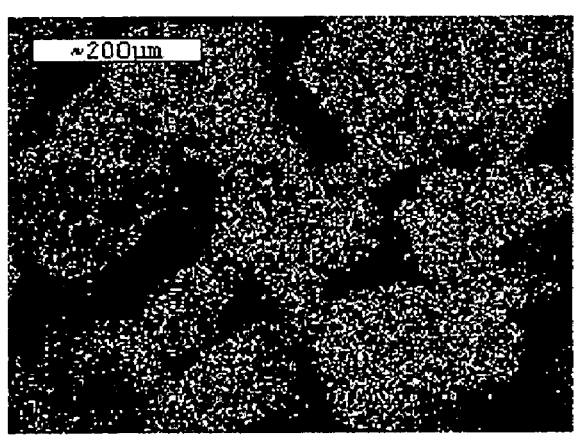

Ni particles were dispersed around TiC particles having a particle size greater than 10 nm, and bonded to the TiC particles to manufacture a TiC+Ni composite. The TiC+Ni composite was ground using a mortar. The electron microscopic image showed that the TiC+Ni composite had a coarse aggregated structure, unlike the TiC or TiCN compound (FIG. 10A). A mapping analysis revealed that the nickel particles were homogeneously dispersed throughout the composite (FIG. 11C).

Figure 11:
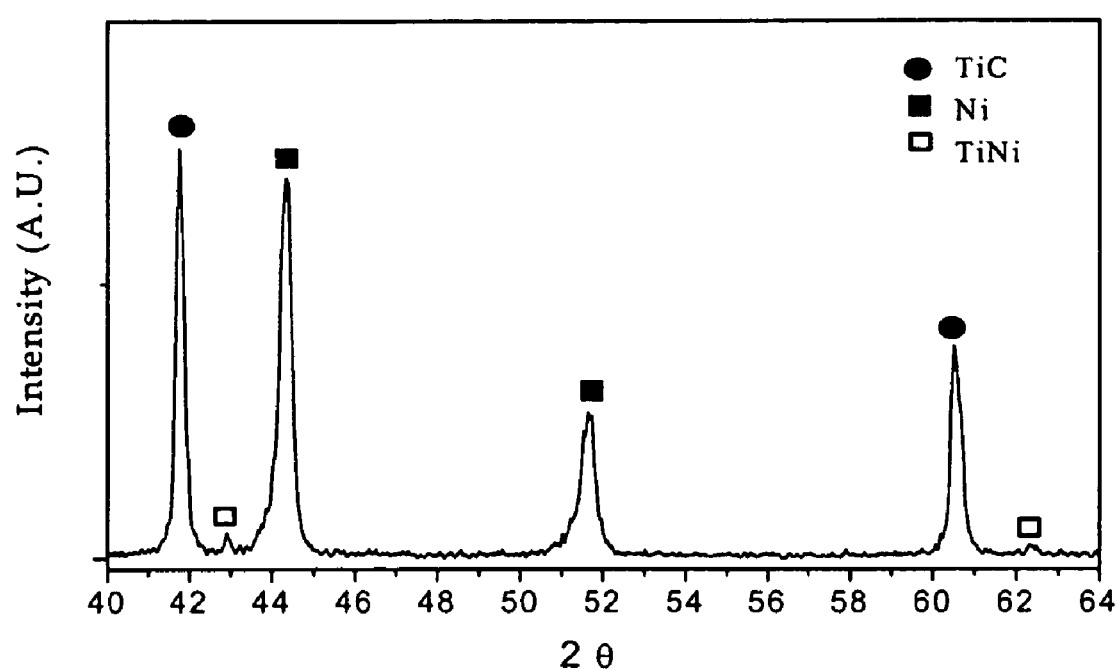
FIG. 11 is an X-ray diffraction pattern from TiC—Ni composite powder manufactured in accordance with the present invention.

Representative X-ray diffraction pattern from Sample No. 1 is shown in FIG. 11. As shown in FIG. 11, diffraction peaks of TiC and Ni were well defined, and a small amount of TiNi, a intermetallic compound, was observed.

Figure 12:
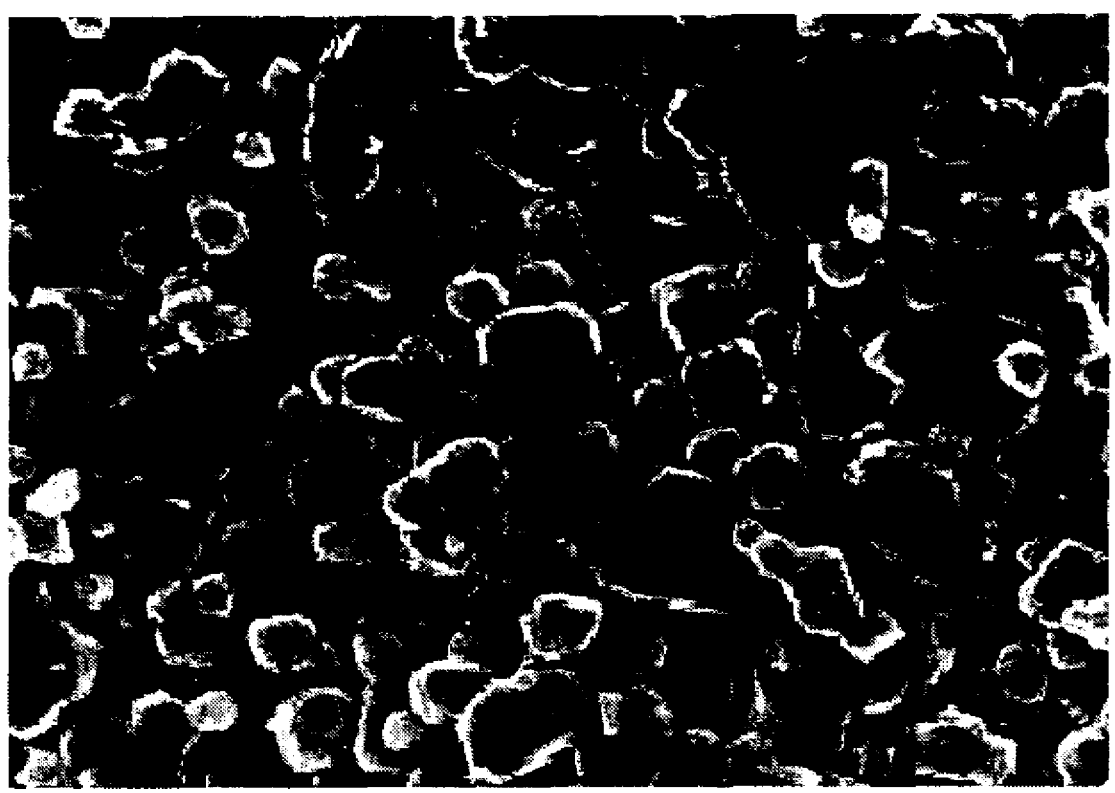
FIG. 12 is a scanning electron microscopic image showing TiC—Ni composite powder manufactured in accordance with the present invention.

As can be seen from the electron microscopic image of FIG. 12, the particle size of the TiC—Ni composite varied over a wide range, from a few tens nm to about 200 nm. This suggested that the Ni particles were adsorbed to the surface of the TiC compound.

On the other hand, X-ray diffraction patterns and fine structures (not shown) of the manufactured TiC—Co and TiC—Al composites were similar to those of the TiC—Ni composite. The only difference was that a very small amount of $Ti_3Al$ appeared in the X-ray diffraction pattern of the TiC—Al composite manufactured using Mg—Al.

As can be seen from FIG. 9, the contents of other impurities (Mg, Cl and O) in the TiC—Ni, Co, Al composites were similar to those in the case of the TiC or TiCN compound. However, the content of Fe was as high as about 2~3 wt %.

This was due to high solubility of Fe in liquid-phase metals (Ni, Co, Al) of molten alloys such as Mg—Ni, Co, Al. Accordingly, alternative materials for the closed container can reduce the high content of Fe as an impurity.

As apparent from the above description, the method according to the present invention has excellent effects over traditional methods for manufacturing TiC compound as follows:

First, since the method according to the present invention can be carried out at a relatively low temperature, the particle growth is relatively slow. Accordingly, it is possible to manufacture TiC powder, TiCN powder or ultrafine nanophase TiC+Ni (Co, Al) and TiCN+Ni (Co, Al) composite powders having a particle size of a few tens nm.

Second, TiC powder, TiCN powder or ultrafine nanophase TiC+Ni (Co, Al) and TiCN+Ni (Co, Al) composite powders can be manufactured in a simpler manner using economically advantageous starting materials such as titanium tetrachloride and carbon chlorides.

Third, the method according to the present invention is extendable to the manufacture of refractory carbides, nitrides, carbonitrides and composite powders thereof using various metal chlorides ($TaCl_5$, $WCl_5$, $BCl_3$, $NbCl_5$, $VCl_4$, $MoCl_5$, etc.) and molten alloys (Mg—Al, Mg—Ni, Mg—Co, etc.).

Finally, the method according to the present invention is suitable for mass production of nanophase TiC-based composite powders, similarly to traditional methods for manufacturing sponge titanium powder. Further, the powders manufactured in accordance with the present invention are industrially advantageous in terms of improving properties of cermet tools.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing nanophase TiC-based composite powders by means of metallothermic reduction, comprising the steps of:
    preparing a starting solution of titanium tetrachloride ($TiCl_4$) in a carbon chloride;
    feeding the starting solution into a closed container containing molten magnesium (Mg) under nitrogen ($N_2$) atmosphere;
    vacuum-separating unreacted liquid-phase Mg and magnesium chloride ($MgCl_2$) remaining after reduction of magnesium from the closed container; and
    collecting a TiCN compound from the closed container.

2. The method for manufacturing nanophase TiC-based composite powders by means of metallothermic reduction according to claim 1, wherein in the step of preparing a starting solution of titanium tetrachloride ($TiCl_4$) in a carbon chloride, the carbon chloride is carbon tetrachloride ($CCl_4$) or tetrachloroethylene ($C_2Cl_4$).

3. The method for manufacturing nanophase TiC-based composite powders by means of metallothermic reduction according to claim 1 or 2, wherein in the step of preparing a starting solution of titanium tetrachloride ($TiCl_4$) in a carbon chloride, the carbon chloride ($CCl_4$ or $C_2Cl_4$) is used in an amount of 1.05~1.15 moles, relative to one mole of titanium tetrachloride ($TiCl_4$).

4. The method for manufacturing nanophase TiC-based composite powders by means of metallothermic reduction according to claim 1, wherein in the step of feeding the starting solution into a closed container containing molten magnesium (Mg) under nitrogen ($N_2$) atmosphere, the feeding of the starting solution is controlled at a rate of 10~20 g/min.

5. The method for manufacturing nanophase TiC-based composite powders by means of metallothermic reduction according to claim 1, wherein the ($N_2$) atmosphere of the closed container containing molten magnesium (Mg) is created by heating at 200° C. under vacuum for 1 hour, feeding nitrogen ($N_2$) gas at 1.1 atm, and heating to a temperature of above 900° C.

6. The method for manufacturing nanophase TiC-based composite powders by means of metallothermic reduction according to claim 1, wherein the molten magnesium (Mg) contained in the closed container under nitrogen ($N_2$) atmosphere is used in an amount of 8~14 moles, relative to one mole of the starting solution.

7. The method for manufacturing nanophase TiC-based composite powders by means of metallothermic reduction according to claim 1, wherein the molten magnesium (Mg) contained in the closed container under nitrogen ($N_2$) atmosphere further includes at least one metal selected from nickel (Ni), cobalt (Co) and aluminum (Al).

* * * * *